Nov. 11, 1941.                E. R. WOLFERT                2,262,417
                    STARTING MEANS FOR CAPACITOR MOTORS
                           Filed Jan. 26, 1940
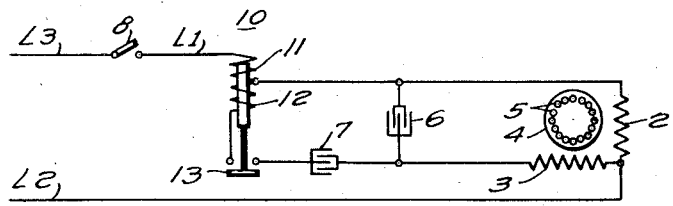
WITNESSES:                                              INVENTOR
E. A. McCloskey.                                    Edward R. Wolfert.
Nw. C. Groome                                       BY O. B. Buchanan
                                                        ATTORNEY Patented Nov. 11, 1941

2,262,417

UNITED STATES PATENT OFFICE 2,262,417

STARTING MEANS FOR CAPACITOR MOTORS

Edward R. Wolfert, Springfield, Mass., assignor to Westinghouse Electric & Manufacturing Company, East Pittsburgh, Pa., a corporation of Pennsylvania Application January 26, 1940, Serial No. 315,700

6 Claims. (Cl. 172—279)

My invention relates to self-starting single-phase induction motors of the type which is commonly known as a capacitor-motor, and it has particular relation to a novel starting-means or method, particularly a two-coil starting-relay for starting capacitor-motors which are designed to deliver exceptionally high torques at starting.

Still more particularly, my invention relates to those capacitor-start motors in which the capacitor-start winding-circuit, or at least a portion thereof, is automatically cut out when the motor attains a certain percentage of its normal running-speed, and in which an external relay, as distinguished from an internal centrifugal switch, must be provided for performing said automatic cutting-out operation, either because of considerations of cost or because the motor is applied in an inaccessible place where a switch-mechanism inside of the motor-casing would be undesirable, referring, for example, to motors for driving hermetically sealed compressors in a refrigerating or air-conditioning apparatus.

Capacitor-motors which have been provided, in the past, with an external current-responsive relay for cutting out all, or a portion, of the starting-winding capacitor after the motor has started up, have heretofore utilized a simple undercurrent relay which drops out upon the subsidence of the starting-current inrush of the motor. However, when exceptionally high torques are required at starting, additional capacity is required in the starting-winding circuit, and this additional starting-capacity gives the motor such a characteristic that the motor-current does not always drop off sufficiently, from its initial starting-current-inrush value, to permit the undercurrent relay-contacts to drop out.

It is the principal object of my present invention to overcome the above-mentioned difficulties by providing an additional winding on the relay, and by connecting the additional winding so that it bucks the flux of the main winding of the relay, or, more generally speaking, so that it tends, when energized, to prevent the operation of the starting-relay. This bucking or restraining coil or winding on the starting-relay is energized in response to all, or a part, of the current flowing in the starting-winding circuit, and this current not only increases in magnitude during the acceleration of the motor, but it also changes its power factor so as to come more nearly in phase with the main motor-current as the motor speeds up. The number of turns of the bucking coil are so proportioned that the undercurrent starting-relay pulls in on the initial current-inrush when the motor is at standstill at the beginning of a starting-operation, and so that the relay drops out correctly when the motor has attained a predetermined proportion of its normal running-speed.

With the foregoing and other objects in view, my invention consists in the combinations, parts, systems and methods hereinafter described and claimed, and illustrated in the accompanying drawing, wherein the single figure is a diagrammatic view of circuits and apparatus embodying my invention in a preferred form of embodiment.

As shown in the drawing, my motor is a self-starting single-phase induction motor, comprising a stationary primary member having a main primary winding 2 and a spatially dephased auxiliary primary winding 3 which is preferably in space-quadrature relation to the main winding 2. The motor also has a rotating secondary member 4 which is provided with a squirrel-cage winding 5, or any equivalent polyaxially closed-circuited secondary winding. The motor is provided with a pair of single-phase supply-leads L1 and L2 which are connected to the terminals of the main primary winding 2, and which are also utilized for energizing the auxiliary or starting winding 3 in a shunt-circuit in parallel to the main winding 2. The starting-winding circuit, as illustrated, includes two capacitors 6 and 7 which are connected in parallel to each other and in series-circuit relation to the starting winding 3, although my invention is also applicable to capacitor-motors which utilize only a single-value capacitor, such as 7, in series with the starting-winding circuit, omitting the capacitor 6. A line-switch 8 is connected in series with the motor-terminal L1 so as to energize the motor from a single-phase supply-line L3—L2.

In accordance with my invention, I utilize a special starting-relay 10 which is provided, not only with the usual main operating winding 11, but also with a second winding 12 which is preferably, though not necessarily, simply superimposed on the main winding 11, or otherwise wound on the same magnetic circuit as the main relay-winding 11. The starting-relay 10 is provided with the usual make-contact 13 which is connected in series with the capacitor 7, so that this capacitor 7 is utilized only for starting-purposes, whereas the other capacitor 6 is utilized for permanent duty during running-conditions as well as the starting-conditions of the motor. The polarity of connections, or the direction of winding, of the auxiliary relay-winding 12 is such that it bucks the magnetizing effect of the main relay-winding 11.

As is usual, in previous undercurrent starting-relays for capacitor-motors, the main relay-winding 11 is connected in series with one of the motor supply-leads, such as L1, or in series with a motor-energizing circuit which includes the energizing-current for at least the main primary winding 2, and preferably also the energizing-current which flows through at least the permanent-duty capacitor 6, although I am not altogether limited to the exact method of connection of the main-circuit operating-winding 11 of the starting-relay 10. The current traversing this main relay-winding 11 may, or may not, include the temporary starting-duty current, flowing through the second capacitor 7.

In operation, when the motor-terminals L1 and L2 are energized, as by the closure of the line-switch 8, current flows first through the main primary winding 2, and also in a parallel circuit through the permanent-duty capacitor 6 and the starting-winding 3. The magnitude of this permanent-duty capacitor 6 is adjusted at the best value for producing torque over the normal range of operating speed at maximum efficiency, so that the capacitance of the capacitor 6 is, in general, not large enough to make the starting-winding current sufficiently out of phase with the main-winding current to start the motor, although a relatively small starting-torque is produced. The current-inrush to the motor is sufficient, however, to so strongly energize the main magnetizing winding 11 of the relay that the relay instantly picks up its make-contact 13 and adds the capacitance of the capacitor 7 to the capacitance of the capacitor 6, in the starting-winding circuit, so that the motor now develops a strong starting-torque, with the current in the starting-winding 3 considerably out of phase with the current in the main-winding 2.

The initial current flowing through the starting-duty capacitor 7, which is in series with the bucking winding 12 of the relay, is not sufficient in magnitude, or near enough in phase with the current in the main relay-winding 11, to cause the relay 10 to drop out its make-contact 13 during the initial starting-period of the motor. As the motor accelerates, or picks up speed, however, the current through the starting-duty capacitor 7 not only increases in magnitude, but also changes in its phase-relation relative to the current in the main relay-winding 11, so that the magnetizing flux in the relay is gradually bucked down until a point is reached, at a motor-speed which is a predetermined percentage of the normal running-speed, when the starting-relay 10 drops out and opens its relay-contact 13, thus disconnecting the starting-duty capacitor 7 and leaving the motor operating on its main winding 2, and with only the permanent-duty capacitor 6 connected in series-circuit relation to the starting-winding 3.

While I have illustrated my invention in a single preferred form of embodiment, it will be obvious that the skilled workers of the art may make many changes in details, by way of substitutions, omissions and additions, without departing from the essential spirit of my invention, particularly in its broader aspects. I desire, therefore, that the appended claims shall be accorded the broadest construction consistent with their language and the prior art.

I claim as my invention:

1. A self-starting single-phase induction motor comprising, in combination: relatively rotating primary and secondary members, the primary member having a main primary winding and a spatially dephased auxiliary primary winding, and the secondary member having a polyaxially closed-circuited secondary winding; a pair of single-phase supply-leads for energizing both of said primary windings; capacitive impedance-means in such circuit-relation to one of said primary windings as to cause the current in said auxiliary primary winding to be out of phase with the current in the main primary winding; and electromagnetically operated control-means operative, when effectively energized, to cause the capacitive impedance-means to have a different effective capacitance than when said control-means is not effectively energized, said control-means having a main magnetizing winding, a bucking winding on the same magnetic circuit as the magnetizing winding, alternating-current means for fairly constantly energizing the main magnetizing winding in response to the energization of the supply-leads of the motor, and means for energizing the bucking winding in response to a predetermined electrical quantity in the auxiliary primary-winding circuit, said predetermined electrical quantity producing a relatively small bucking-effect when the motor first starts, and increasing its bucking-effect as the motor picks up speed.

2. A self-starting single-phase induction motor comprising, in combination: relatively rotating primary and secondary members, the primary member having a main primary winding and a spatially dephased auxiliary primary winding, and the secondary member having a polyaxially closed-circuited secondary winding; a pair of single-phase supply-leads connected to said main primary winding; an auxiliary primary-winding circuit also connected across said pair of single-phase supply-leads, said auxiliary primary-winding circuit including the auxiliary primary winding and capacitive impedance-means in series-circuit relation to each other; and a starting relay having a make-contact in series-circuit relation to at least a part of said capacitive impedance-means, said relay having a main magnetizing winding, a bucking winding on the same magnetic circuit as the magnetizing winding, alternating-current means for fairly constantly energizing the main magnetizing winding in response to the energization of the supply-leads of the motor, and means for energizing the bucking winding in response to a predetermined electrical quantity in the auxiliary primary-winding circuit, said predetermined electrical quantity producing a relatively small bucking-effect when the motor first starts, and increasing its bucking-effect as the motor picks up speed.

3. A self-starting single-phase induction motor comprising, in combination: relatively rotating primary and secondary members, the primary member having a main primary winding and a spatially dephased auxiliary primary winding, and the secondary member having a polyaxially closed-circuited secondary winding; a pair of single-phase supply-leads connected to said main primary winding; an auxiliary primary-winding circuit also connected across said pair of single-phase supply-leads, said auxiliary primary-winding circuit including the auxiliary primary winding and two capacitors, the two capacitors being connected in shunt-circuit relation to each other and in series-circuit relation to said auxiliary winding; and a starting relay having a make-contact in series-circuit relation to one of said capacitors but not the other capacitor, said relay having a main magnetizing winding, a bucking winding on the same magnetic circuit as the magnetizing winding, alternating-current means for fairly constantly energizing the main magnetizing winding in response to the energization of the supply-leads of the motor, and means for energizing the bucking winding in response to a predetermined electrical quantity in the auxiliary primary-winding circuit, said predetermined electrical quantity producing a relatively small bucking-effect when the motor first starts, and increasing its bucking-effect as the motor picks up speed.

4. A self-starting single-phase induction motor comprising, in combination: relatively rotating primary and secondary members, the primary member having a main primary winding and a spatially dephased auxiliary primary winding, and the secondary member having a polyaxially closed-circuited secondary winding; a pair of single-phase supply-leads for energizing both of said primary windings; capacitive impedance-means in such circuit-relation to one of said primary windings as to cause the current in said auxiliary primary winding to be out of phase with the current in the main primary winding; and electromagnetically operated control-means operative, when effectively energized, to cause the capacitive impedance-means to have a different effective capacitance than when said control-means is not effectively energized, said control-means having a main magnetizing winding, a bucking winding on the same magnetic circuit as the magnetizing winding, means for energizing the main magnetizing winding in series-circuit relation to a motor-energizing circuit which includes the energizing-current for at least the main primary winding, and means for energizing the bucking winding in response to a predetermined electrical quantity in the auxiliary primary-winding circuit, said predetermined electrical quantity producing a relatively small bucking-effect when the motor first starts, and increasing its bucking-effect as the motor picks up speed.

5. A self-starting single-phase induction motor comprising, in combination: relatively rotating primary and secondary members, the primary member having a main primary winding and a spatially dephased auxiliary primary winding, and the secondary member having a polyaxially closed-circuited secondary winding; a pair of single-phase supply-leads connected to said main primary winding; an auxiliary primary-winding circuit also connected across said pair of single-phase supply-leads, said auxiliary primary-winding circuit including the auxiliary primary winding and capacitive impedance-means in series-circuit relation to each other; and a starting relay having a make-contact in series-circuit relation to at least a part of said capacitive impedance-means, said relay having a main magnetizing winding, a bucking winding on the same magnetic circuit as the magnetizing winding, and means for energizing the main magnetizing winding and the bucking winding in series-circuit relation to two different energizing-current circuits of the motor.

6. A self-starting single-phase induction motor comprising, in combination: relatively rotating primary and secondary members, the primary member having a main primary winding and a spatially dephased auxiliary primary winding, and the secondary member having a polyaxially closed-circuited secondary winding; a pair of single-phase supply-leads connected to said main primary winding; an auxiliary primary-winding circuit also connected across said pair of single-phase supply-leads, said auxiliary primary-winding circuit including the auxiliary primary winding, a permanent-duty capacitor and a starting-duty capacitor, the two capacitors being connected in shunt-circuit relation to each other and in series-circuit relation to said auxiliary winding; and a starting relay having a make-contact in series-circuit relation to the starting-duty capacitor but not the permanent-duty capacitor, said relay having a main operating winding tending, when energized, to effect an operation of said relay, and a restraining winding tending, when energized, to prevent said operation of the relay, means for energizing the main operating winding in series-circuit relation to a motor-energizing circuit which includes the currents through the main primary winding and at least the permanent-duty capacitor of the auxiliary primary-winding circuit, and means for energizing the restraining winding in response to a predetermined electrical quantity in the auxiliary primary-winding circuit, said predetermined electrical quantity producing a relatively small restraining-effect when the motor first starts, and increasing its restraining-effect as the motor picks up speed.

EDWARD R. WOLFERT.